(12) United States Patent
Zhang et al.

(10) Patent No.: US 6,293,454 B1
(45) Date of Patent: Sep. 25, 2001

(54) INSTALLATION FOR POSITIONING AND WELDING BODY PARTS OF DIFFERENT TYPES OF MOTOR VEHICLES

(75) Inventors: Yimin Zhang, München (DE); Scott Rhoads, Moore, SC (US); Manfred Moser, Driessen; Jean-Luc Trenchant, Unterankenreute, both of (DE)

(73) Assignees: Thyssen-Krupp Technologies AG, Essen; Bayerische Motoren Werke Aktiengesellschaft, Munich, both of (DE)

( * ) Notice: Subject to any disclaimer, the term of this patent is extended or adjusted under 35 U.S.C. 154(b) by 0 days.

(21) Appl. No.: 09/601,378
(22) PCT Filed: Apr. 28, 1999
(86) PCT No.: PCT/EP99/02858
  § 371 Date: Jul. 26, 2000
  § 102(e) Date: Jul. 26, 2000
(87) PCT Pub. No.: WO99/56908
  PCT Pub. Date: Nov. 11, 1999

(30) Foreign Application Priority Data

May 6, 1998 (DE) ............................................. 198 20 094

(51) Int. Cl.[7] ................................................. B23K 37/04
(52) U.S. Cl. ............................ 228/4.1; 228/44.3; 219/80; 219/161
(58) Field of Search ................................. 228/182, 212, 228/4.1, 44.3, 45, 47, 49.1; 29/430, 429, 759; 219/79, 80, 86.24, 158

(56) References Cited

U.S. PATENT DOCUMENTS 4,483,476 * 11/1984 Fujikawa et al. .
4,538,044 * 8/1985 Kadowaki et al. .
4,589,184 * 5/1986 Asano et al. .
4,800,249 * 1/1989 Di Rosa .
4,972,987 * 11/1990 Di Rosa .
5,123,161 * 6/1992 Kubo et al. .
5,143,270 * 9/1992 Hamada et al. .
5,165,164 * 11/1992 Kubo et al. .
5,374,799 * 12/1994 Nishimoto et al. .
5,397,047   3/1995 Zampini .
5,400,943 * 3/1995 Rossi .
5,409,158 * 4/1995 Angel .
6,109,424 * 8/2000 Doan .

FOREIGN PATENT DOCUMENTS 32 30 455  12/1983 (DE) .
0 438 989   7/1991 (EP) .
2 175 546  12/1986 (GB) .

* cited by examiner

Primary Examiner—Tom Dunn
Assistant Examiner—Jonathan Johnson
(74) Attorney, Agent, or Firm—McGlew and Tuttle, P.C.

(57) ABSTRACT

An installation for positioning and welding body parts of different types of motor vehicles. The installation includes a mounting frame (5) which is guided on a conveyor line and which has receiving elements for at least some vehicle body parts. Positioning devices (8) are provided for the vehicle body parts (6) and at least one robot is provided for carrying out welding work. The invention is very flexible in terms of product modifications. The mounting frame (5) has positioning devices for at least some vehicle body parts (6) and clamping devices for the vehicle body parts. An additional (lower) conveyor line (10) is located under the first conveyor (2). One of several auxiliary mounting frames (12) is guided on the additional conveyor line. Parking positions (13) for the auxiliary mounting frames (12) are provided next to the lower conveyor line (10). The auxiliary mounting frames (12) each have receiving elements for other vehicle body parts of different types of vehicles and devices for positioning and clamping with the mounting frame (5). A lifting device (17) is also provided for the auxiliary mounting frame (12).

13 Claims, 8 Drawing Sheets

INSTALLATION FOR POSITIONING AND WELDING BODY PARTS OF DIFFERENT TYPES OF MOTOR VEHICLES

FIELD OF THE INVENTION

The present invention pertains to a unit for positioning and welding body parts of different motor vehicle models with an assembly frame, which is guided on a conveyor belt and has mounts for at least one body part, with positioning means for the body parts and with at least one robot that can be used for welding operations.

BACKGROUND OF THE INVENTION

A unit of the above-described type is known from DE 32 30 455 C2. Body parts of two different motor vehicle models can be positioned and welded. The body parts are placed on an assembly frame, which is also called geometry skid in practice, and is brought into a welding station together with the assembly frame. Replaceable positioning means, with which the body parts lying on the assembly frame are positioned before they are welded together, are arranged in the area of the welding station. The assembly frame is then moved on with the welded body parts. However, this is not sufficient in modern production lines for motor vehicles if a frequent change from one model to another is required, e.g., between motor vehicles with four doors, with two doors or station wagons.

SUMMARY AND OBJECTS OF THE INVENTION

The object of the present invention is therefore to guarantee high flexibility in terms of required product changes in a unit of the type described in the introduction.

This object is accomplished by the assembly frame having positioning structure for at least some body parts and a clamp for body parts. The clamping device can be actuated from the outside. An additional conveyor belt is arranged under the conveyor belt. The additional conveyor belt guidingly supports a plurality of auxiliary assembly frames. Parking positions are provided next to the lower conveyor belt. The auxiliary assembly frames have mounts for additional body parts of different motor vehicle models as well as means for positioning and bracing with the assembly frame. A lifting device is provided for lifting the auxiliary assembly frame.

In this unit, the assembly frame has all the necessary mounts for the body parts, e.g., the chassis of a motor vehicle, wherein the chassis may comprise the subunits front part, rear part, engine mount and floor panel. The body parts, which are placed on the assembly frame and are first positioned there and are later welded to other body parts, remain on the assembly frame and are fixed with the associated clamping means or clamping device of the assembly frame there. These clamping means of the assembly frame may be designed as toggle lever tensioners, which can be actuated by means of external adjusting drives, so that no energy is used on the assembly frame to clamp or actuate the clamping means. However, it is equally possible to use clamping means with tensioners that can be actuated pneumatically. It is sufficient for the clamping means to be braced at the beginning of a section of the production line, optionally via a separate medium connection, and to be released again at the end of this section.

A plurality of auxiliary assembly frames, which are guided on a conveyor belt of their own under the conveyor belt for the assembly frame, are available for product changes. Each auxiliary assembly frame has mounts for body parts of a certain motor vehicle model and, in addition, means for positioning these body parts and also a means for positioning and bracing with the assembly frame, so that the auxiliary assembly frame can be positioned and thus braced relative to the assembly frame after the auxiliary assembly frame has been raised by the lifting device to under the assembly frame. Additional body parts can then be placed on those already present and positioned with the positioning means of the auxiliary assembly frame. A rapid change of the auxiliary assembly frames is possible if conveying means are provided in the area of the parking positions fore the conveying of the auxiliary assembly frames between the lower conveyor belt and a parking position. Eccentric or chain lifters driven pneumatically or with an electric motor may be provided as conveying means together with cross belts.

After the assembly frame and the auxiliary assembly frame have been brought together, the body parts located on them are positioned in relation to one another such that they can be welded together by at least one robot.

Specifically, the conveyor belts may have two rails, which are arranged at mutually spaced locations from one another and are provided with rollers to enable the mounts and the means for positioning and bracing the auxiliary assembly frame to be moved to the assembly frame without problems. The positioning means, the clamping means of the assembly frame and of the auxiliary assembly frame may be arranged on columns originating from the respective frames, it being evident that there is a sufficient distance permitting a rapid change of an auxiliary assembly frame between the upper conveyor belt for the assembly frame and the lower conveyor belt for the auxiliary assembly frame.

In a preferred embodiment of the present invention, at least one support frame with abutments and positioning means for additional body parts, which the support frame can be moved by the robot and can be placed on the assembly frame, is provided. This support frame makes it possible to place additional, loose body parts on the assembly frame and/or the auxiliary assembly frame and to position and fix them simultaneously by means of the support frame. The support frame can be braced with the assembly frame and/or the auxiliary assembly frame for this purpose.

In view of product changes, different support frames are provided for body parts of different motor vehicle models. When not in use, these different support frames may be stored in a storage area, which is arranged in the work area of the robot.

It is obvious that the robot is set up in this connection not only for welding operations, but also for handling operations, namely, for conveying the support frames and the body parts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
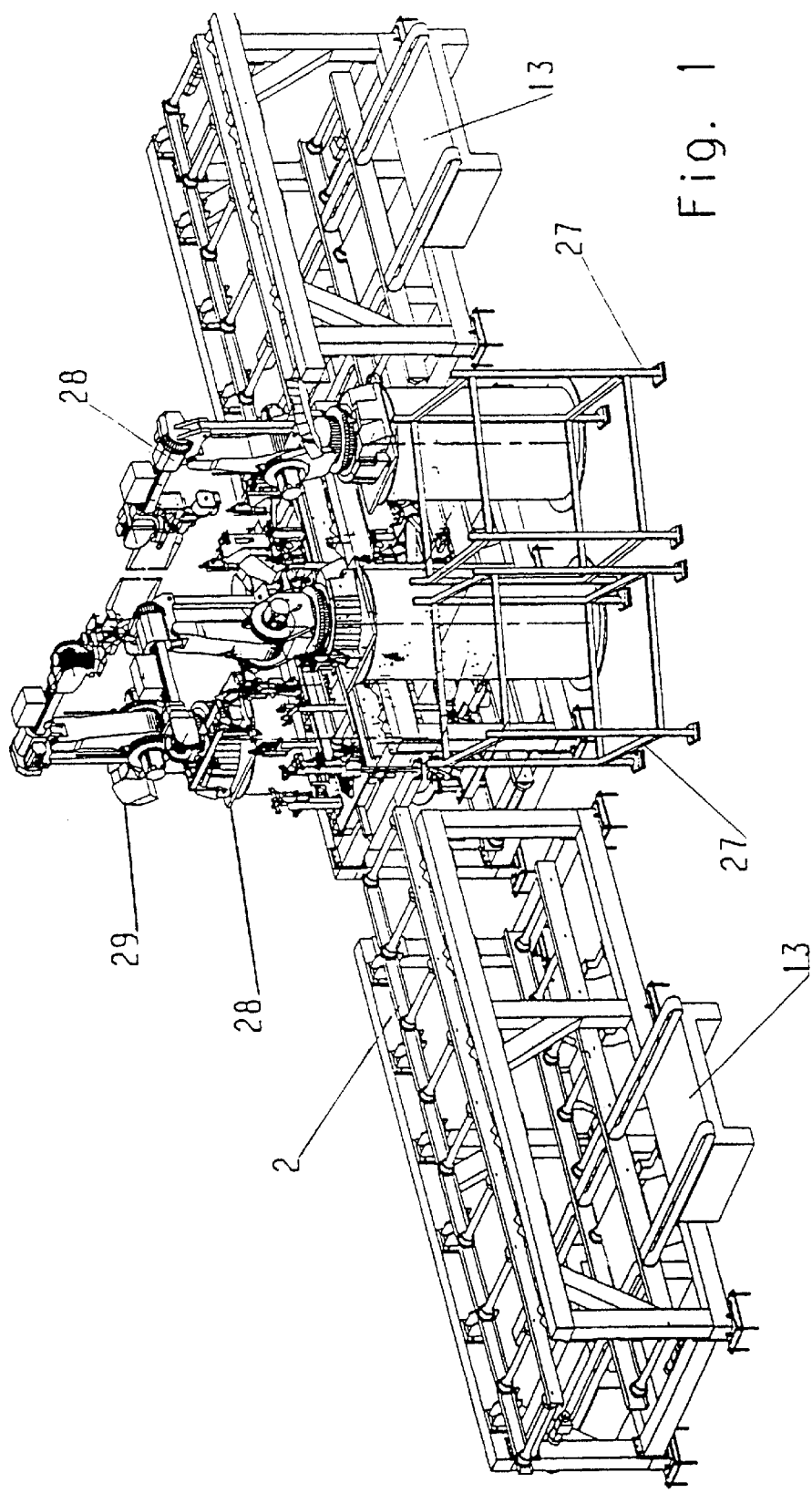
FIG. 1 is a schematic top perspective view showing a so-called geometry station (welding station in a production line for the assembly of motor vehicle body parts)

Referring to the drawings in particular, FIG. 1 shows a section of a production line for the assembly of body parts of a motor vehicle. The chassis parts of the motor vehicle, comprising the front part, the rear part and the floor panel, are assembled and the individual body parts are welded together in the exemplary embodiment. The degree of separation of the individual body parts may also be different depending on the customers' specifications.

Figure 2:
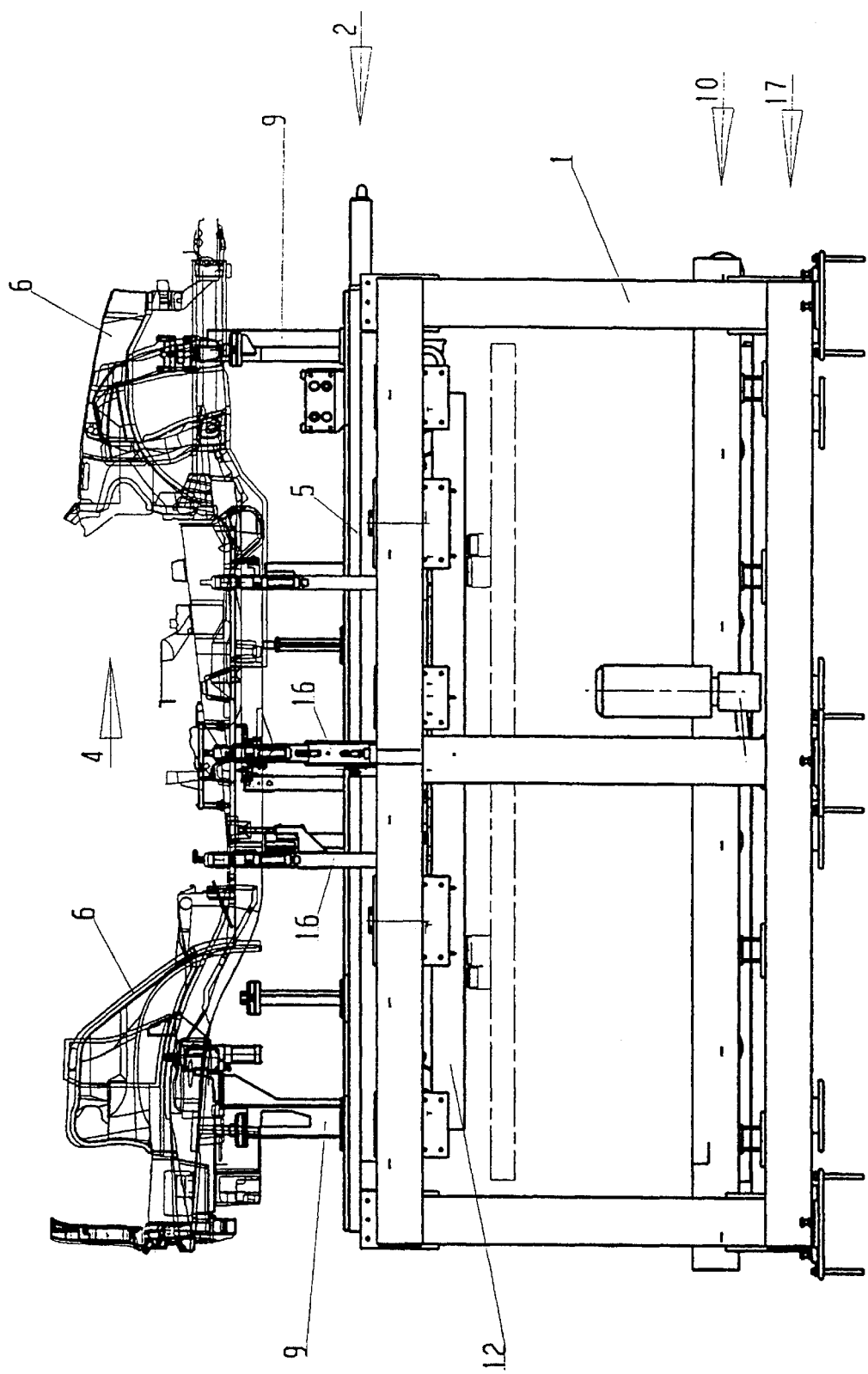
FIG. 2 is a partially and schematic side view of the object according to FIG. 1.
Figure 3:
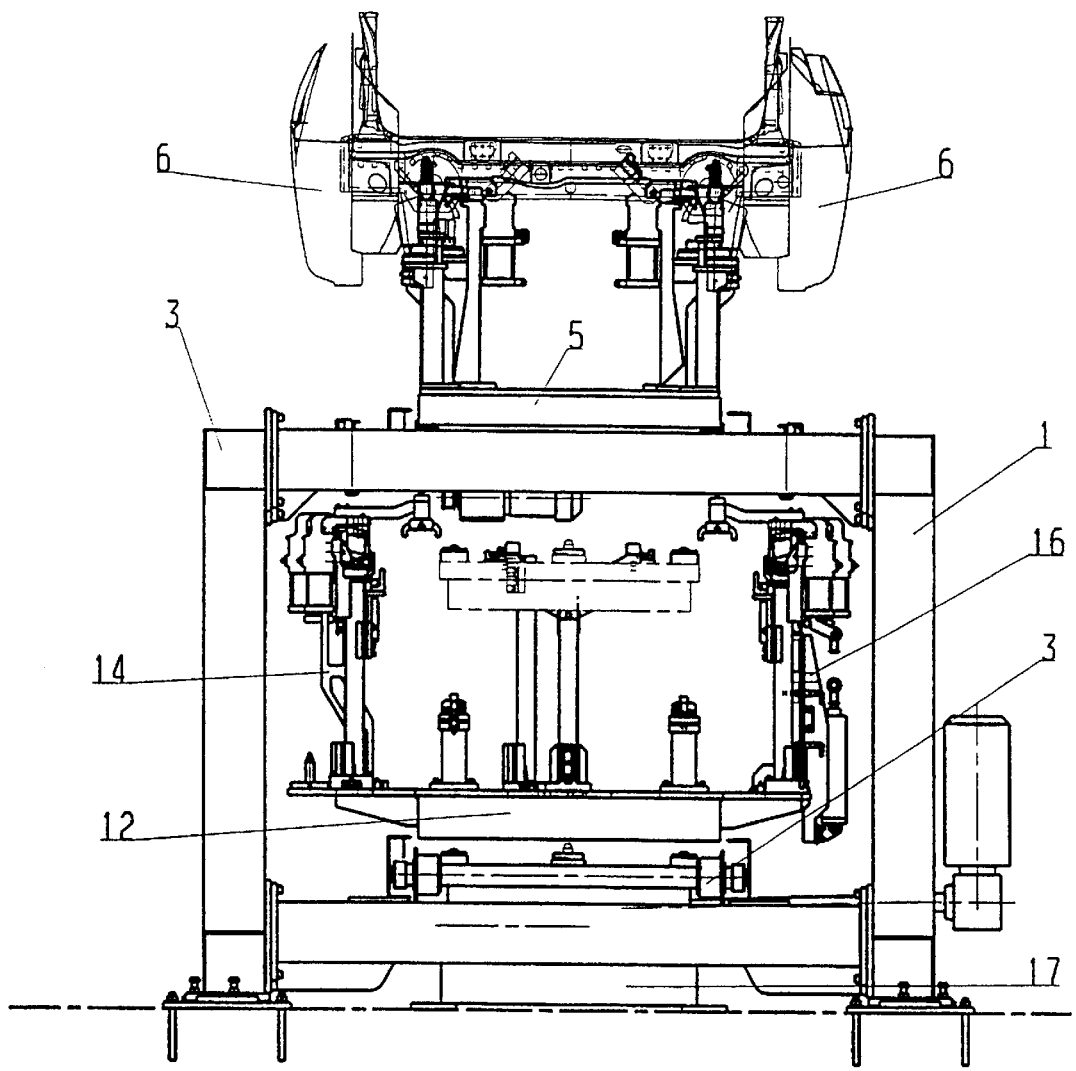
FIG. 3 is a partially schematic vertical sectional view through the object according to FIG. 2.
Figure 4:
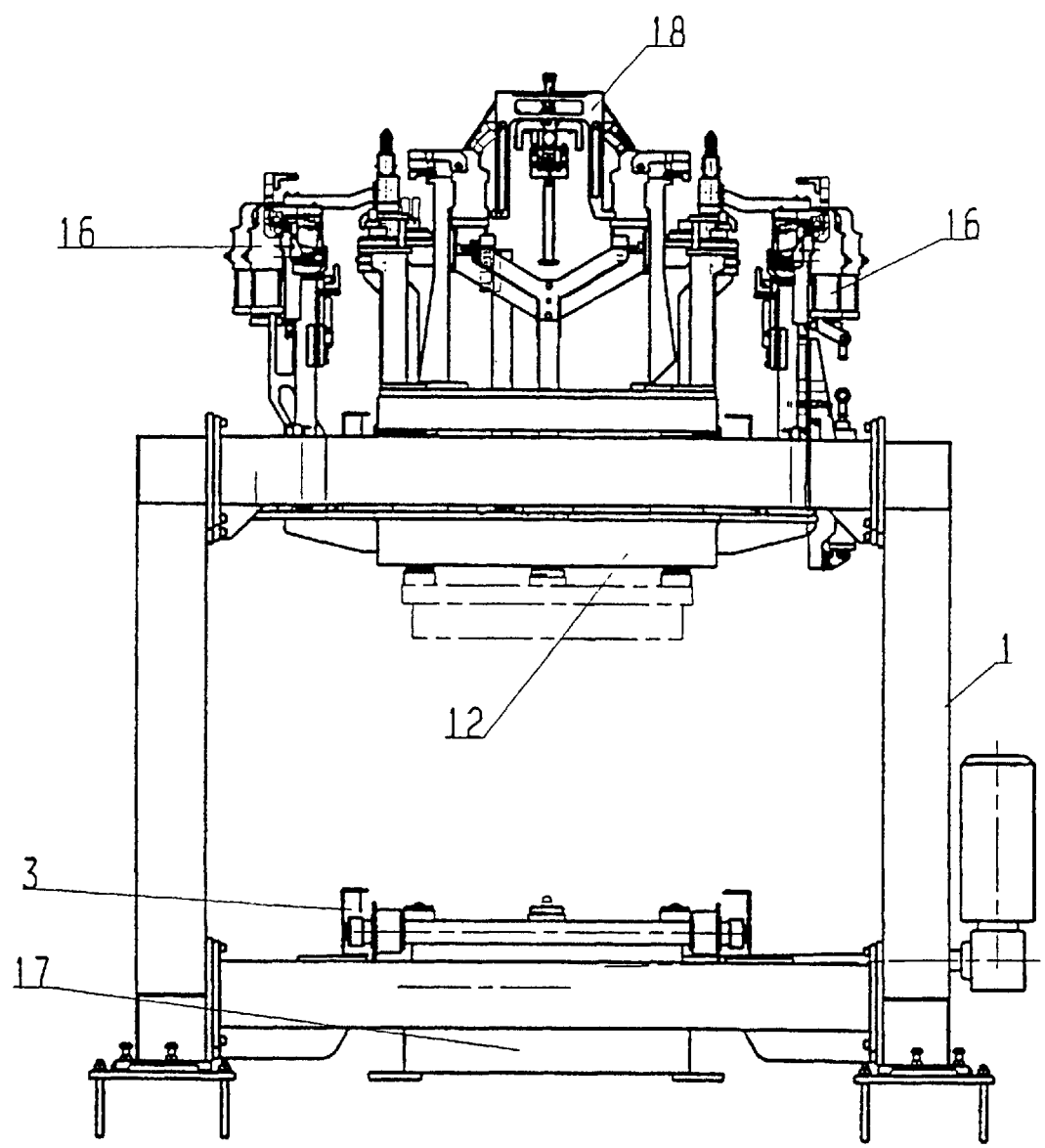
FIG. 4 is a partially schematic vertical sectional view through the object according to FIG. 3 in another functional position.

An upper conveyor belt 2, which comprises two rails (FIG. 3), which are arranged at mutually spaced locations and are provided with rollers 3, is arranged in a frame 1 (FIG. 2) belonging to the production line. The rollers 3 have drives, not shown.

Figure 5:
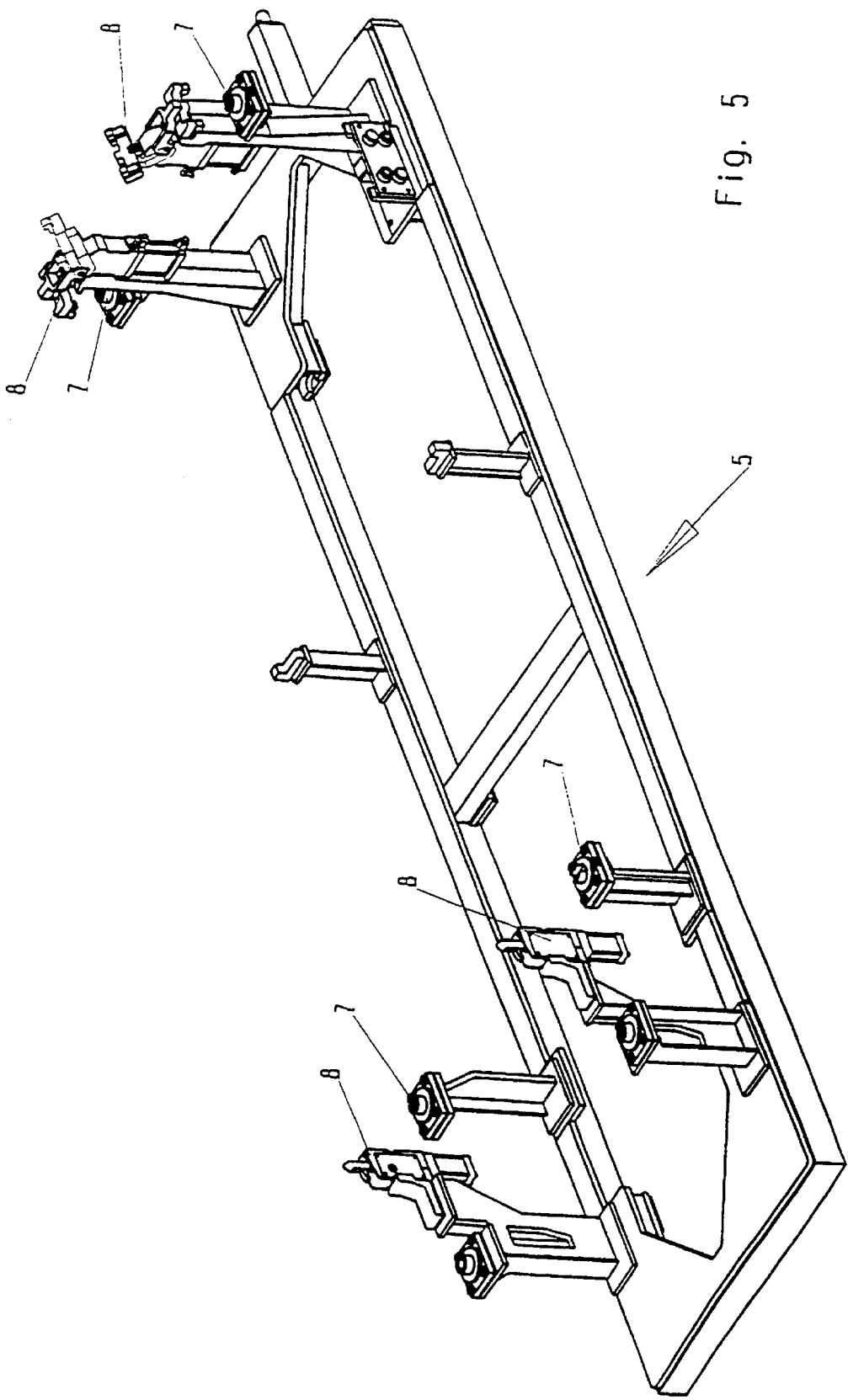
FIG. 5 is a partial schematic perspective view of an assembly frame.
Figure 6:
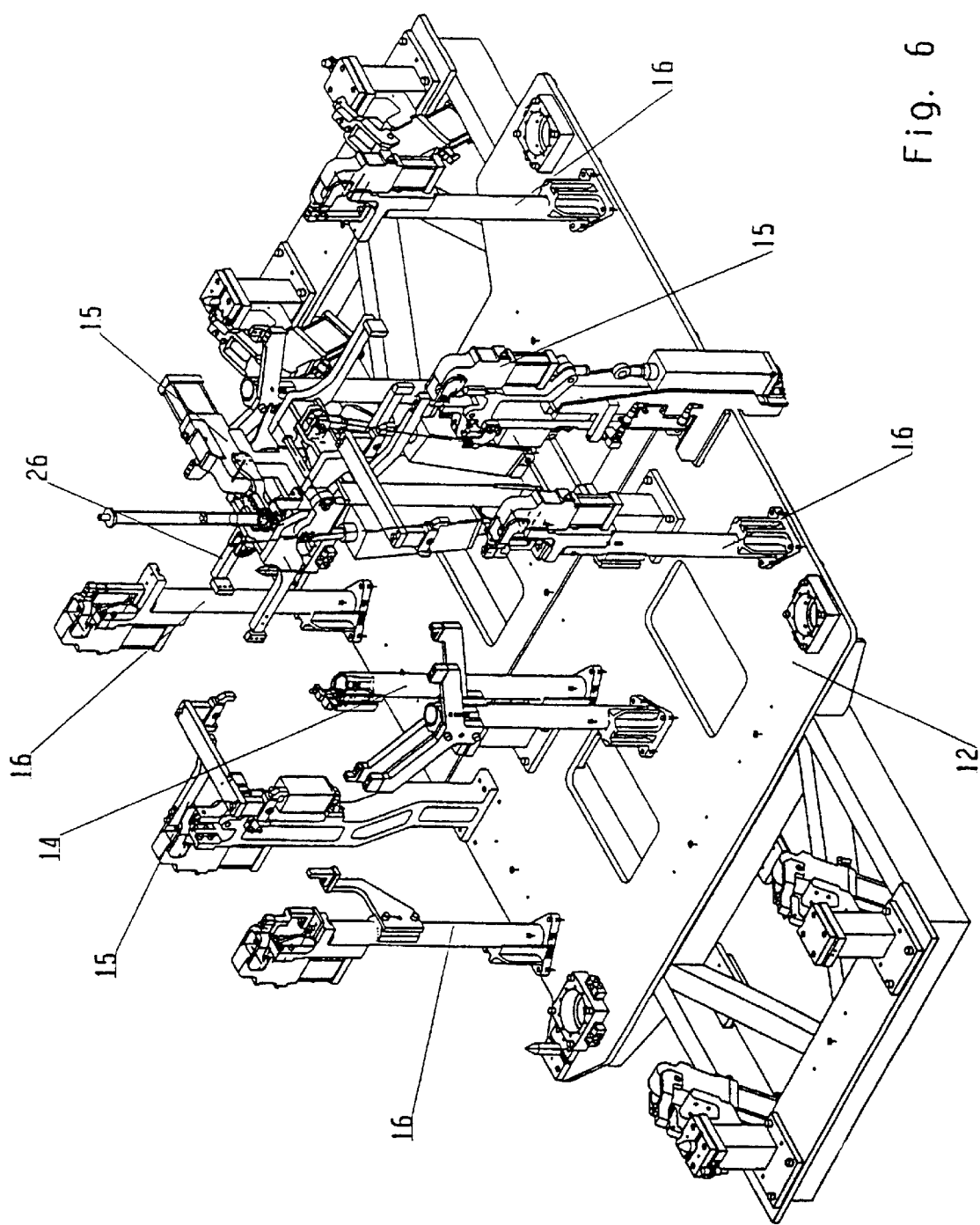
FIG. 6 is a partial schematic perspective view of an auxiliary assembly frame.
Figure 7:
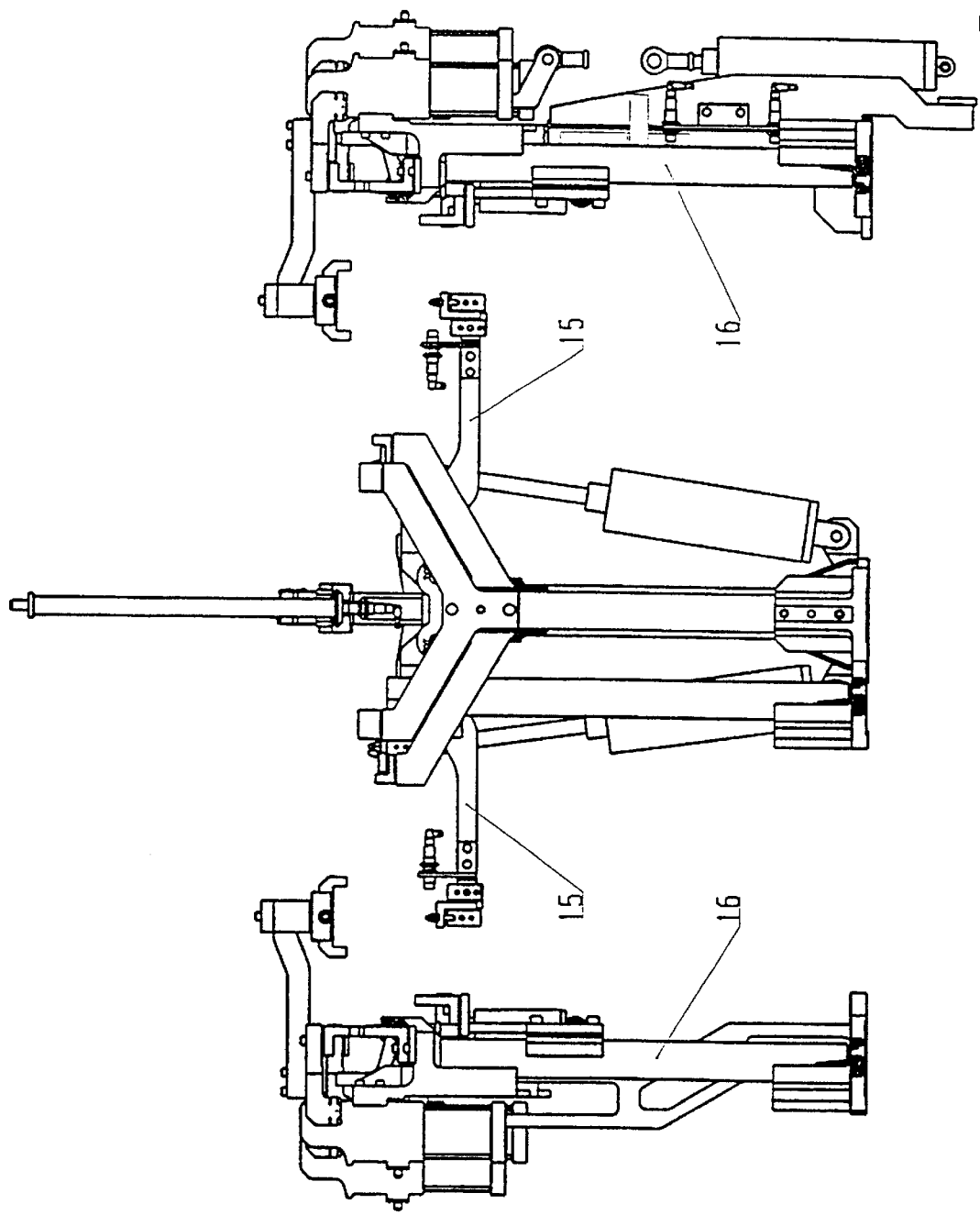
FIG. 7 is a partial view in the conveying direction of means arranged on the auxiliary assembly frames.

An assembly frame 5, on which individual body parts 6 had been placed in advance, is introduced on the conveyor belt 2 in the conveying direction 4. For this purpose, the assembly frame 5 has supports 7 for the body parts 6 and clamping devices or clamping means 8 for the body parts 6 (FIG. 5), which supports are arranged on columns. The clamping device 8 are actuated by external adjusting drives, not shown, so that no energy is needed on the assembly frame 5 for actuating these clamping device. However, it is just as possible to use clamping device with tensioners that can be actuated pneumatically. The body parts placed on the assembly frame 5 and positioned there by means of centering pins 9 are fixed on the assembly frame 5 at the beginning of a section of the production line by means of the externally actuated clamping device 8 and are moved on in this state to the end of the section, where the clamping device 8 are again released by means of external adjusting drives.

Another conveyor belt 10, which likewise comprises rollers 11 that are arranged at mutually spaced locations and can be driven (FIGS. 2 and 3), is located in the frame 1 under the conveyor belt 2. One of a plurality of auxiliary assembly frames 12 can be moved on this conveyor belt 10. There is a parking position 13 arranged next to the production line for each auxiliary assembly frame 10. A total of four parking positions 13 are provided in the embodiment shown. An assembly frame 12 can be brought by means of a conveying means, not shown, from its parking position 13 onto the conveyor belt 10 or vice versa.

Each auxiliary assembly frame 12 has means 14 arranged on columns for positioning as well as means 15 for bracing additional body parts. These means 14, 15 are arranged on columns and are arranged in different spatial arrangements in relation to the auxiliary assembly frame 12 depending on different model types. In addition, each auxiliary assembly frame 12 has pivotable clamping device 16, especially toggle lever tensioners, which can be actuated pneumatically and are used to brace the auxiliary assembly frame 12 with the assembly frame 5. This will be explained later.

A lifting device 17, which is designed as a scissor-type elevating platform in the embodiment shown, is located under the conveyor belt 10 for the auxiliary assembly frame 12. The lifting device 17 is used to lift off the auxiliary assembly frame 12 from its conveyor belt 10 and to move it toward the underside of the assembly frame 5 so that the auxiliary assembly frame 12 can be braced with the assembly frame 5.

Figure 8:
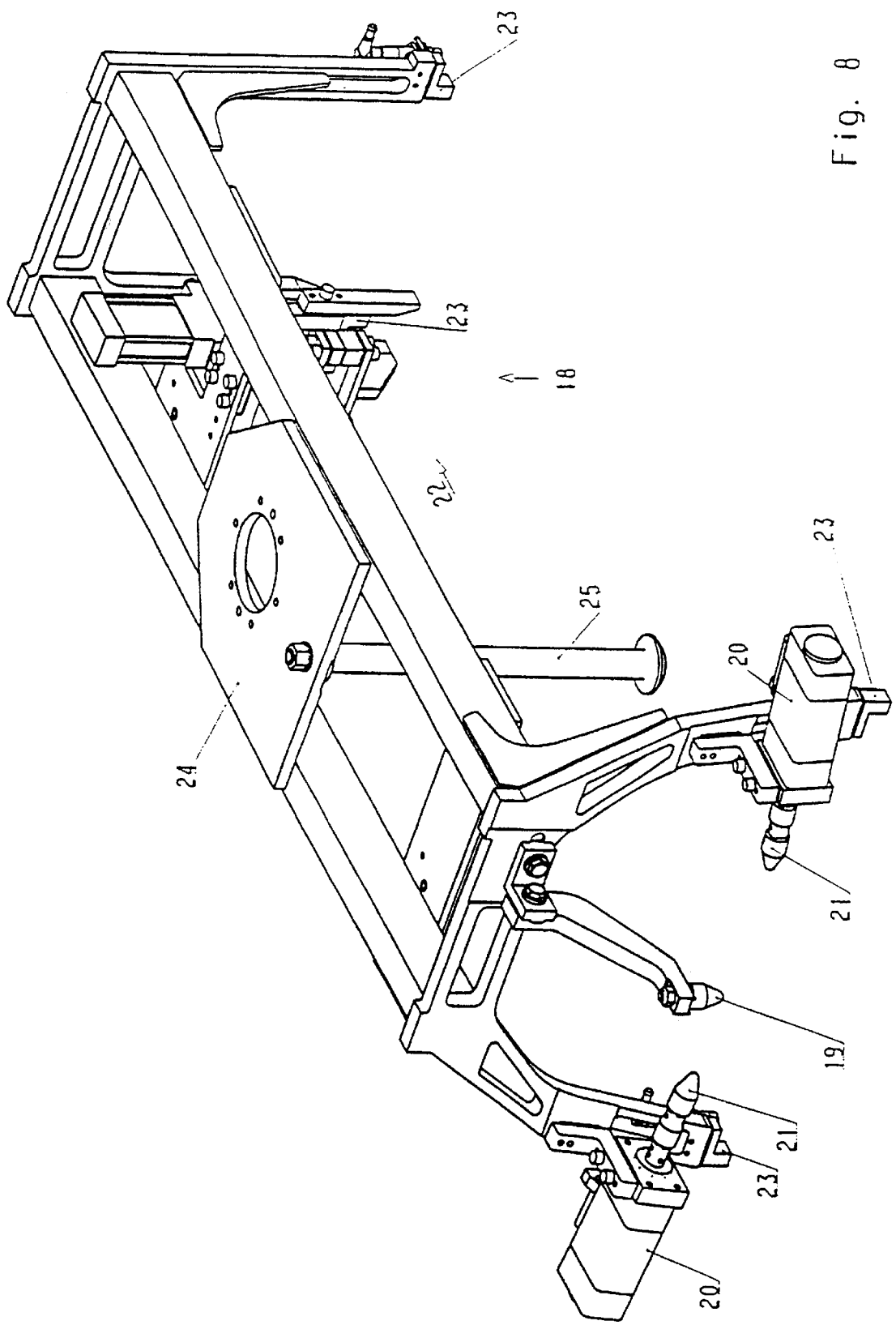
FIG. 8 is a partial, schematic perspective view of a support frame.

The unit being described also includes a support frame 18 shown in FIG. 8. In the embodiment shown, the support frame has at least one fixed centering pin 19 and two centering pins 21 adjustable with lifting cylinders 20 for positioning, e.g., a tunnel part. In the embodiment shown, the support frame 18 has a clamping device 22 for bracing, e.g., a seat carrier spar.

Abutments 23 of the support frame 18 hold the body parts against the assembly frame 5. A connection component 24, which can be grasped by the robots, is located on the top side of the support frame 18. A tensioning spindle 25, on which a clamping device 26 of the auxiliary assembly frame 12 can act, originates from the connection component 24.

The unit being described includes various assembly frames 18, in which the construction and the spatial arrangement of the means or components belonging to them are adapted to the body parts of different motor vehicle models. Support frames 18 that are not needed are stored in at least one storage area 27. In the embodiment shown (FIG. 1), two storage areas 27 are arranged, which are located in the work area of two robots 28 arranged next to the production line and next to the frame 1, respectively, so that one robot 28 or another can bring the proper support frame 18 over the frame 1.

The robot 28 can be retooled, i.e., it can be used for conveying the support frames 18, on the one hand, and for welding operations on the body parts, on the other hand. Another robot 29 for welding operations is located on the other side of the frame 1.

The unit being described operates as follows: An assembly frame 5 loaded with body parts 6 is moved on its conveyor belt 2 into the area of the robots 28, 29. An auxiliary assembly frame 12 already present in this area is raised by means of the lifting device 17 and then braced with the assembly frame 5 by means of the pivotable clamping device 16. Additional body parts are then placed on the assembly frame 5, and they are brought into the correct position by means of the positioning means 14 originating from the auxiliary assembly frame 12. The support frame 18 needed in the particular case is then placed by means of one of the robots 28 on the body parts thus prearranged, which are now aligned and fixed if necessary. The body parts thus fixed can subsequently be welded by means of the robots 28, 29. After the end of the welding operations, the support frame 18 is again removed and the auxiliary assembly frame 12 is again lowered. The assembly frame 5 with the body parts, which lie on it and have been welded together, is moved on on its conveyor belt and the next assembly frame 5 with body parts placed on it loosely is introduced for the further processing.

If body parts of other motor vehicle models are to be welded together, only the auxiliary assembly frame 12 needs to be replaced with another one and the support frame 18 needs to be replaced with another one.

While specific embodiments of the invention have been shown and described in detail to illustrate the application of the principles of the invention, it will be understood that the invention may be embodied otherwise without departing from such principles.

What is claimed is:

1. A unit for positioning and welding body parts of different motor vehicle models, the unit comprising:
   an assembly frame;
   a conveyor, the assembly frame being guidable on said conveyor and having mounts for at least some body parts, with positioning elements for body parts and with clamping devices for continuously bracing the body parts relative to each other on the assembly frame;
   at least one robot that can be used for welding operations;
   a plurality of auxiliary assembly frames;
   an additional conveyor arranged under said conveyor, said additional conveyor guiding any one of said auxiliary assembly frames;
   parking positions for said auxiliary assembly frames provided next to said lower conveyor, said auxiliary assembly frames having mounts for additional body parts of different motor vehicle models as well as elements for positioning said additional body parts relative to an associated auxiliary assembly frame and a bracing device for bracing the auxiliary assembly frame to the assembly frame with parts on the auxiliary assembly disposed relative to parts on the assembly frame; and
   a lifting device for lifting any one of said auxiliary assembly frames.

2. A unit in accordance with claim 1, further comprising: a conveying device for conveying any one of said auxiliary assembly frames between said lower conveyor and a said parking position provided in an area of said parking positions.

3. A unit in accordance with claim 1, wherein said conveyor has rails arranged at mutually spaced locations and provided with rollers.

4. A unit in accordance with claim 1, wherein said positioning elements for body parts and with clamping devices for the body parts of said assembly frame and of said auxiliary assembly frame, respectively, are arranged on columns originating from the frame.

5. A unit in accordance with claim 1, wherein said clamping devices of said assembly frame are toggle lever tensioners actuated by external adjusting devices.

6. A unit in accordance with claim 1, further comprising: a support frame with abutments and positioning elements for additional body parts, said support frame being movable by said robot and can being positionable on said assembly frame.

7. A unit in accordance with claim 1, further comprising: a support frame with abutments and positioning elements for additional body parts, said support frame be braceable with said assembly frame and/or with said auxiliary assembly frame.

8. A unit in accordance with claim 6, wherein further different support frames are provided for body parts of different motor vehicle models.

9. A unit in accordance with claim 7, wherein further said different support frames are provided for body parts of different motor vehicle models.

10. A unit in accordance with claim 6, further comprising a storage area for a support frame arranged in the work area of the said robot.

11. A body part positioning and welding unit comprising:
    an assembly frame;
    a conveyor, the assembly frame being guidable on said conveyor and having mounts for at least some body parts, with positioning elements for body parts and with clamping devices for bracing the body parts relative to each other;
    at least one robot movable in a range adjacent to said assembly frame at a location along said conveyor;
    a plurality of auxiliary assembly frames;
    an additional conveyor arranged under said conveyor, said additional conveyor for guiding an auxiliary assembly frame;
    a parking position for an auxiliary assembly frame, said parking position being provided next to said lower conveyor, said auxiliary assembly frames having mounts for additional body parts of different motor vehicle models as well as elements for positioning and bracing the parts on the auxiliary assembly frames to the parts braced on said assembly frame; and
    a lifting device for lifting any one of said auxiliary assembly frames.

12. A vehicle component positioning and welding unit comprising:
    an assembly frame with columns, with supports arranged on said columns, with centering pins for positioning components and with clamps for continuously bracing the positioned vehicle body parts relative to each other to provide a geometry;
    an assembly frame conveyor for moving said assembly frame along a guide path at one horizontal level;
    at least one robot movable in a range adjacent to said assembly frame at a location along said conveyor for operation at said one horizontal level;
    a plurality of auxiliary assembly frames, each of said auxiliary assembly frames including a support for positioning additional vehicle body parts of a particular vehicle model, braces for bracing the position of the additional vehicle body parts relative to each other to provide a geometry and a frame bracing device for connecting the associated auxiliary assembly frame to said assembly frame to position the positioned and braced additional vehicle body parts relative to the positioned and braced body parts of said assembly frame to provide combination geometry for welding additional vehicle body parts together with positioned and braced body parts of said assembly frame;
    an additional conveyor arranged under said assembly frame conveyor, said additional conveyor for guiding any of said auxiliary assembly frames independently of the conveyance of said assembly frame and on a guide path that is independent of from a guide path of said assembly frame conveyor;
    a parking position for an auxiliary assembly frame, said parking position being provided next to said lower conveyor; and
    a lifting device for lifting any one of said auxiliary assembly frames for connecting any one of said auxiliary assembly frames to said assembly frame.

13. A unit in accordance with claim 12, further comprising: a support frame with abutments and positioning elements for additional body parts, said support frame being movable by said robot and can being positionable on said assembly frame.

* * * * *